W. V. FRANK.
OSCILLATING MOTOR.
APPLICATION FILED NOV. 14, 1908.
930,657.
Patented Aug. 10, 1909.
2 SHEETS—SHEET 1.
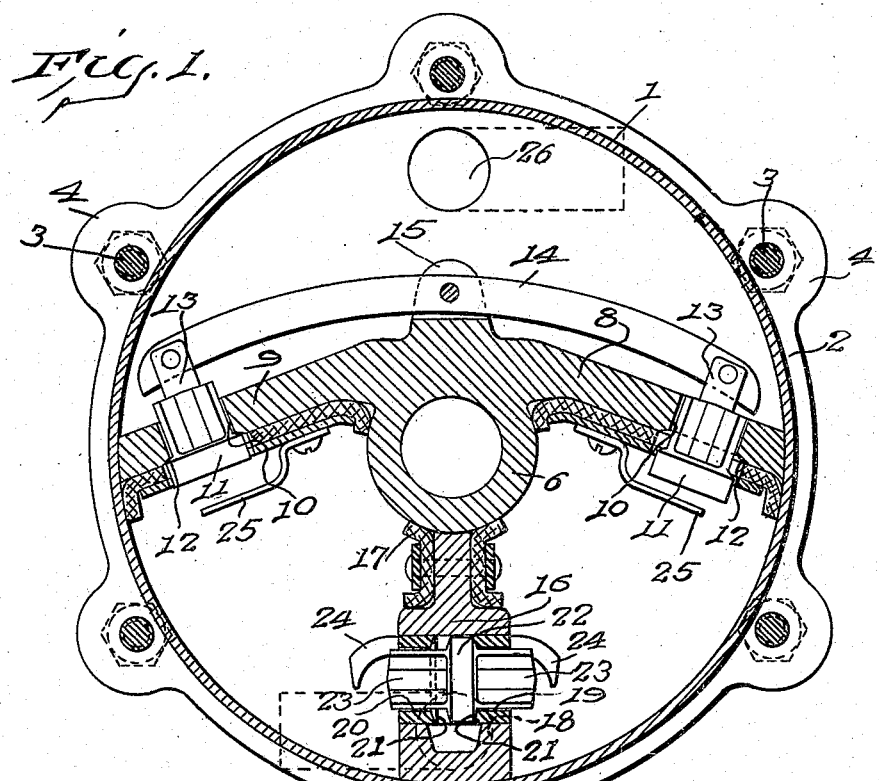
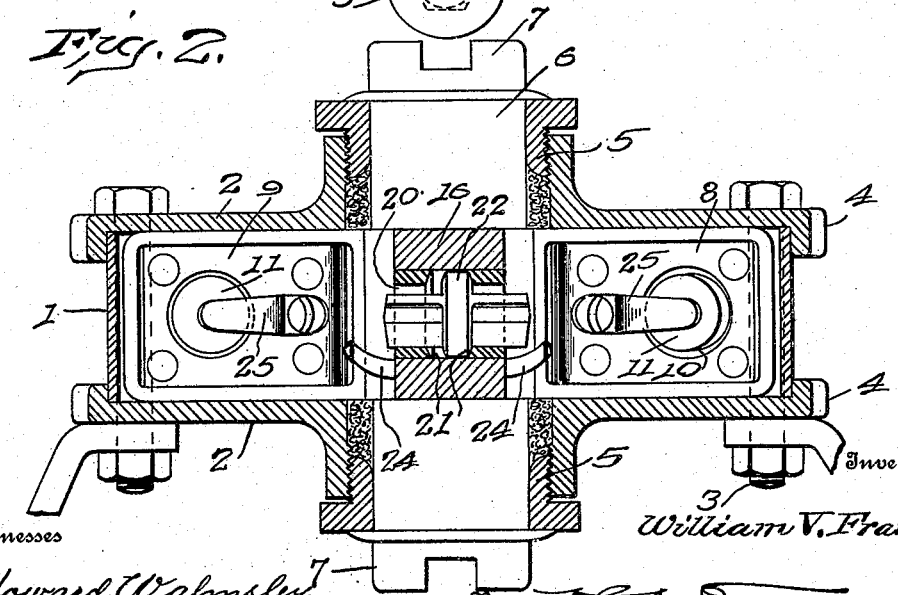
Witnesses
G. Howard Walmsley
Edward L. Reed
Inventor
William V. Frank,
By H. A. Toulmin,
Attorney

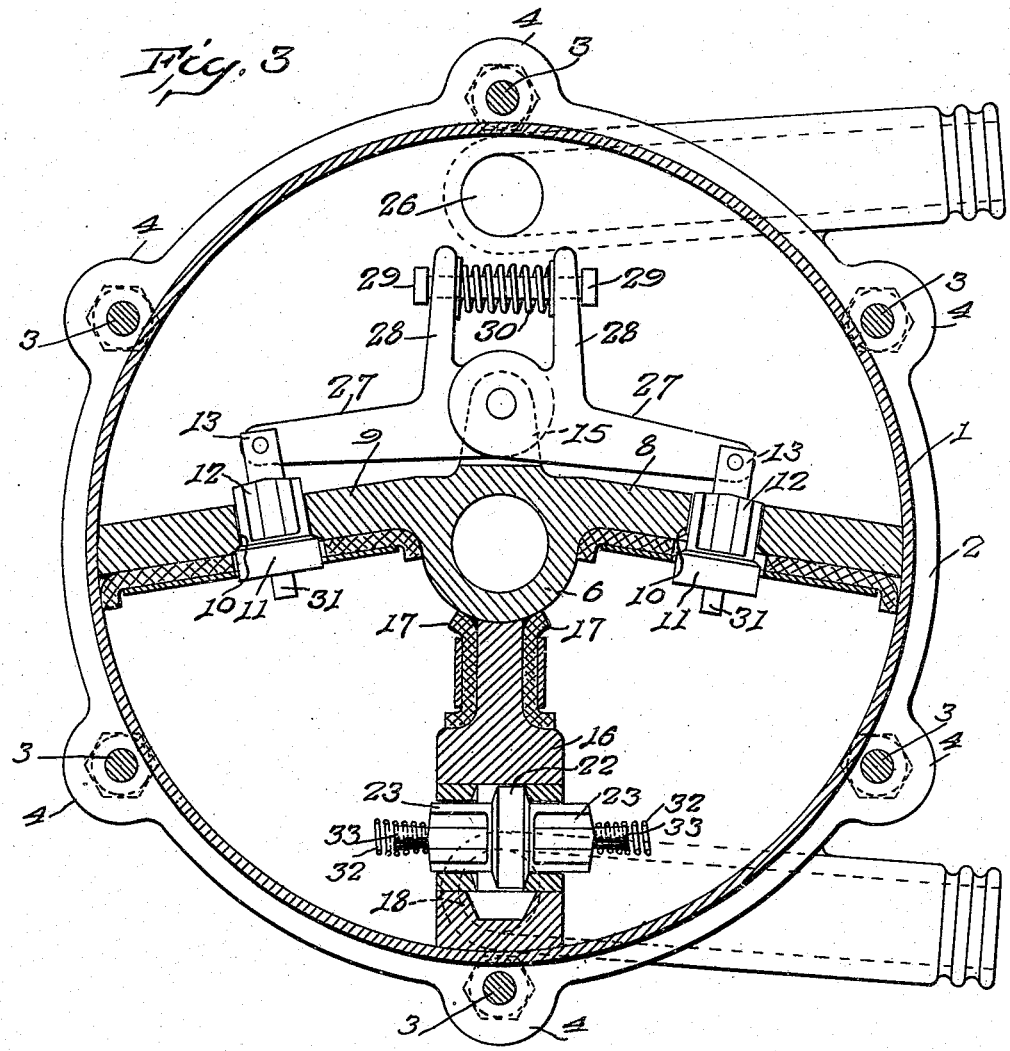

UNITED STATES PATENT OFFICE.

WILLIAM V. FRANK, OF SPRINGFIELD, OHIO, ASSIGNOR OF ONE-THIRD TO CHARLES OSTERLE AND ONE-THIRD TO GEORGE W. FRANK, OF SPRINGFIELD, OHIO.

OSCILLATING MOTOR.

No. 930,657.  Specification of Letters Patent.  Patented Aug. 10, 1909.

Application filed November 14, 1908. Serial No. 462,546.

*To all whom it may concern:*

Be it known that I, WILLIAM V. FRANK, a citizen of the United States, residing at Springfield, in the county of Clark and State of Ohio, have invented certain new and useful Improvements in Oscillating Motors, of which the following is a specification, reference being had therein to the accompanying drawings.

This invention relates to oscillating motors.

The object of the invention is to provide a hydraulic motor of this character in which the water in front of the piston will offer but a minimum amount of resistance to the movement of the piston; to provide an improved arrangement of the valves for controlling and reversing the movement of the pistons; to provide positive means for actuating these valves; and to provide a motor of a very simple construction which will have a high degree of efficiency.

With these objects in view my invention consists in certain novel features and in certain parts and combinations hereinafter to be described, and then more particularly pointed out in the claims.

In the accompanying drawings, Figure 1 is a horizontal, sectional view of a motor embodying my invention; Fig. 2 is a vertical, sectional view of such a motor; and Fig. 3 is a horizontal sectional view of a slightly modified form of the invention.

In these drawings I have illustrated the preferred form of my invention and have shown the same as comprising a casing consisting of a cylindrical body portion 1, provided at its opposite ends with caps or cylinder heads 2 which are secured one to the other by means of bolts 3 extending through lugs 4 carried by the respective cylinder heads. These cylinder heads are provided with centrally arranged vertical bearings 5, in which is journaled a shaft 6, which, in the present instance, is shown as provided at its opposite ends with clutch members 7. This shaft 6 is provided with oppositely extending wings or pistons 8 and 9 adapted to move in the chamber formed within the casing 1. These pistons are, in the present instance, shown as formed integral with the shaft and extending tangentially from one side thereof, the body portions of the wings being turned at an angle to those portions of the pistons which are connected to the shaft 6, thus causing the pistons to occupy intersecting vertical planes. Each of these pistons is provided with an aperture 10 controlled by a valve 11 adapted to engage a valve seat 12 formed in the face of the piston. Each piston is also provided with a valve stem 13 which extends through the opening 10 to the rear side of the piston and is there connected to one end of a lever or arm 14 which is pivotally mounted on a lug 15 mounted near the inner ends of the two pistons. Thus, the closing of one valve will serve to open the other valve.

A partition or abutment 16 is mounted within the cylinder 1 and completely fills the space between the shaft and the wall of the cylinder and the top and bottom cylinder heads, it being provided on its inner end with a suitable packing 17 to permit of the rotation of the shaft 6, and, at the same time, provide a water-tight joint between the shaft and the abutment. This partition is provided with an inlet 18 extending through one of the cylinder heads 2 and connected with the chamber, within the cylinder 1, on the opposite sides of the abutment 16 by means of transverse openings 19 and 20, each of which is provided with an inwardly facing valve seat 21, the valve seats of the two openings being spaced some distance apart. Each opening is controlled by a valve, and, in the present instance, I have shown the valves of the two openings as formed integral and comprising a single valve member 22 having its opposite faces beveled to coöperate with the valve seats 21. This valve member 22 is provided with guides 23 extending through the openings and of such a length that, when the valve is in engagement with one of the valve seats 21, the stem or guide 23 will extend beyond the outer end of the corresponding opening. The abutment is provided with a finger 24 extending outwardly and upwardly into a position in the path of the valve 11 carried by the adjacent piston and each piston is provided with a finger 25 extending outwardly to a point in front of the valve carried by that piston and into such a position that it will engage the guide or stem 23 of the valve 22.

With the valves in the position shown in Fig. 1, the water will enter through the opening 20 and the piston 9 will be moved away from the abutment. This movement will continue until the piston 8 is moved into such a position that the finger 25 carried thereby will engage the guide 23 and move the valve 22 away from the valve seat of the opening 19, thus changing the flow of the water from one side to the other of said abutment. Simultaneously with the operation of this valve the finger 24 engages the valve 11 in the piston 8 and closes the same, the closing of this valve serving, through the medium of the lever 14, to open the valve 11 in the piston 9. Thus, as the water enters the chamber behind the piston 8, this piston will be moved away from the abutment and the piston 9 toward the abutment, the water in that portion of the chamber between the piston 9 and the abutment escaping through the opening 10 of the piston 9, the valve 11 of that opening being open, and passing through the outlet opening 26 in the lower cylinder head of the casing. This outlet 26 is arranged in such a position in the cylinder head that neither of the pistons 8 and 9 will pass over the same. This arrangement, in the present instance, consists in locating the outlet diametrically opposite the abutment 16, and arranging the pistons 8 and 9 at an angle one to the other in the manner shown.

Thus, it will be seen that I have provided a motor having two pistons 8 and 9, these pistons being provided with openings to permit the escape of the exhaust through the piston and into the chamber in the rear of the same, whence it passes to the outlet. This construction enables the water to readily escape from the front of the piston so that it offers but a minimum amount of resistance to the movement of the piston. Further, I have employed but a single valve for controlling the inlet and have provided positive means for actuating both this valve and the valves in the pistons. It will also be seen that the motor is of exceedingly simple construction, being entirely free from complicated mechanism and having its parts of such a character that they are not easily disarranged or broken; and further, that, owing to the double piston arrangement, the small amount of resistance offered to the movement of the piston by the exhaust water, the character of the valves and the positive control thereof, the motor has a very high degree of efficiency and will operate with a very low water pressure.

It has been found desirable in using the motor in connection with certain kinds of work to provide additional means for facilitating the reversal of the valves in the pistons and to this end I have substituted for the single arm 14, which connects the valves 11 in Fig. 1, a separate arm 27 for each valve. These arms are connected at their outer ends to the stem 13 and are pivotally mounted near their inner ends on the lug 15 carried by the shaft 6. Each arm is provided near its pivotal center with an outwardly extending finger 28, which fingers preferably extend substantially parallel one to the other. A pin 29 extends through the fingers 28 near the outer ends thereof and a spring 30 is coiled about the pin 29 between the fingers and serves to force the same apart and to move the outer ends of the arms 27 toward the respective pistons or wings 8 and 9. The valves 11 are arranged in their respective pistons in such a position that when the piston lies close to the abutment 16 a stem or projection 31 carried by the valve 11 will engage the wall of the abutment and the further movement of the piston will close that valve. With the valves in the position shown in Fig. 3, as the piston 8 approaches the abutment, the stem 31 of the valve 11 will engage the abutment and move that valve toward its seat. The pressure of the water against the valve in the piston 9 will hold that valve in its seat until the spring 30 has been compressed to such an extent as to overcome that pressure, when the valve will be instantly moved from its seat and the movement of the pistons reversed. The valve member 22 in the abutment 16 is also preferably provided with additional means for facilitating its movement, which, in the present instance, consists of springs 32 mounted on pins 33 carried by the guides 23 of said valve member 22. These springs are arranged in such a position as to be engaged by the approaching piston which will compress the spring until the tension has become sufficient to quickly reverse the position of the valve member 22. It will also be noted that in this form of the device the inlet and outlet are both formed in the lower head of the cylinder, this construction, however, being an arbitrary one and the arrangement of the inlet and outlet being capable of modification to suit the circumstances surrounding the use of the motor. It will also be apparent that many alterations may be made in the construction and arrangement of the motor without departing from the spirit of the invention. For instance, while the fingers 24 shown in Figs. 1 and 2, for facilitating the movement of the valves 11, are desirable under some circumstances, they may be readily dispensed with, and, in the motor as now constructed, they are not used. I therefore wish it to be understood that I do not desire to be limited to the details of construction shown and described, for obvious modifications will occur to a person skilled in the art.

Having thus fully described my invention, what I claim as new and desire to secure by Letters Patent, is:—

1. A motor comprising a cylindrical casing forming a chamber, a shaft journaled in said casing, pistons carried by said shaft, extending into said chamber on opposite sides thereof and having openings therein, valves controlling said openings, means for simultaneously moving said valves in opposite directions, whereby, when one of said valves is open, the other will be closed, an abutment mounted in said casing and extending between the cylindrical wall thereof and said shaft, said chamber having an inlet opening connected therewith on opposite sides of said abutment, valves controlling said inlet opening, and means for moving said valves in opposite directions, whereby, when said inlet is in communication with the chamber on one side of said abutment, it will be closed against communication with the chamber on the other side thereof, and an outlet opening formed in that side of said casing opposite said abutment.

2. A motor comprising a cylindrical casing forming a chamber, a shaft journaled in said casing, pistons carried by said shaft, extending into said chamber on opposing sides thereof and having openings therein, valves controlling said openings, means for so connecting said valves one to the other that, when one of said valves is open the other will be closed, an abutment mounted in said casing and extending between the cylindrical wall thereof and said shaft, said chamber having an inlet opening connected therewith on the opposite sides of said abutment, valves controlling said inlet opening, and means for operatively connecting said valves one to the other, whereby, when said inlet opening is in communication with the chamber on one side of said abutment, it will be closed against communication with the chamber on the other side thereof, and an outlet opening formed in that portion of said casing opposite said abutment.

3. A motor comprising a cylindrical casing forming a chamber, a shaft journaled in said casing, pistons carried by said shaft, extending into said chamber on opposite sides thereof and having openings therein, valves controlling said openings, means pivotally mounted on said shaft for so connecting said valves one to the other that, when one of said valves is opened the other will be closed, an abutment mounted in said casing and extending between the cylindrical wall thereof and said shaft, said chamber having an inlet opening connected therewith on opposite sides of said abutment, valves controlling said opening, means for simultaneously actuating said valves, and an outlet opening formed in that portion of said casing substantially opposite said abutment.

4. A motor comprising a cylindrical casing forming a chamber, a shaft journaled in said casing, pistons carried by said shaft, extending into said chamber on opposite sides thereof and having openings therein, valves controlling said openings, means for so connecting said valves one to the other that, when one of said valves is open the other will be closed, an abutment mounted in said casing and extending between the cylindrical wall thereof and said shaft, said chamber having an inlet opening connected therewith on the opposite sides of said abutment, valves controlling said inlet opening, said valves being rigidly connected one to the other and so arranged that, when said inlet is in communication with the chamber on one side of said abutment, it will be closed against communication with the chamber on the other side thereof, and an outlet opening formed in that portion of said casing opposite said abutment.

5. A motor comprising a cylindrical casing forming a chamber, a shaft journaled in said casing, a pair of pistons carried by said shaft and having openings therein, valves controlling said openings, means for operatively connecting said valves one to the other, whereby the opening of the valve in one piston will close the valve in the other piston, an abutment in said casing between said pistons, said chamber having an inlet opening connected therewith on opposite sides of said abutment, valves controlling said inlet opening and so arranged that when said inlet is in communication with the chamber on one side of said abutment, it will be closed against communication with the chamber on the other side thereof, means for simultaneously reversing said valves to change the flow of water from one side of said chamber to the other and for reversing the position of the valves in said piston, and an outlet opening formed in said casing on the side of said pistons opposite said abutment.

6. A motor comprising a cylindrical casing forming a chamber, a shaft journaled in said casing, a pair of pistons carried by said shaft and having openings therein, valves controlling said openings, arms pivotally mounted in the rear of said pistons and connected to the respective valves, a spring interposed between said arms and adapted to move the outer ends thereof toward the respective pistons, an abutment mounted in said casing between said pistons and having an inlet opening connected with said chamber on the opposite sides thereof, and a valve for controlling said inlet opening.

7. A motor comprising a cylindrical casing forming a chamber, a shaft journaled in said casing, a pair of pistons carried by said shaft and having openings therein, valves controlling said openings, an arm connected to each of said valves and pivotally mounted in the rear of said piston, a finger extending outwardly from each of said arms, a spring interposed between said fingers, an abutment mounted in said casing between said pistons and having an inlet opening connected with said chamber on the opposite sides thereof, and a valve for controlling said inlet opening.

8. A motor comprising a cylindrical casing forming a chamber, a shaft journaled in said casing, two pistons secured to said shaft and having openings therein, valves for controlling said openings, means for operatively connecting said valves one to the other, whereby the opening of the valve in one piston will close the valve in the other piston, and an abutment mounted in said casing between said pistons, said chamber having an inlet opening on each side of said abutment and an outlet opening.

In testimony whereof, I affix my signature in presence of two witnesses.

WILLIAM V. FRANK.

Witnesses:
    GEORGE S. DIAL,
    F. C. SCHMAHL.